United States Patent Office 3,839,381
Patented Oct. 1, 1974

3,839,381
ZIRCONOCENE NAPHTHALENE COMPLEX
Guido P. Pez, Boonton, N.J., assignor to Allied Chemical Corporation, New York, N.Y.
No Drawing. Continuation-in-part of application Ser. No. 180,144, Sept. 13, 1971, now Patent No. 3,776,932. This application Apr. 26, 1973, Ser. No. 354,830
Int. Cl. C07f 7/00
U.S. Cl. 260—429.3         1 Claim

ABSTRACT OF THE DISCLOSURE

Zirconocene naphthalene of formula $$[(\pi\text{---}C_5H_5)_2Zr \cdot C_{10}H_8]_n$$

is prepared by low temperature reaction in an ethereal solvent between an alkali metal naphthalene and a dihalogenide of dicyclopentadienyl zirconium.

The complex has utility as an absorbent of nitrogen.

CROSS REFERENCE TO RELATED APPLICATION

This application is a continuation-in-part to my U.S. application Ser. No. 180,144 filed Sept. 13, 1971, now U.S. Pat. No. 3,776,932.

BACKGROUND OF THE INVENTION

I. Field of the Invention

This invention relates to a metal-organo complex having the structure:

$$[(\pi\text{---}C_5H_5)_2Zr \cdot C_{10}H_8]_n$$

II. Description of the Prior Art

In the early nineteen fifties a new class of organo metallic compounds was discovered, starting with dicyclopentadienyl iron or "ferrocene." Analogous compounds were soon prepared, similarly complexing a great many of the transition metals. Particular attention was focused on the titanium complex, reported to be dicyclopentadienyl titanium, and also referred to as "titanocene."

In 1966 Watt and Drummond believed they had produced zirconocene, i.e. dicyclopentadienyl zirconium II.

By 1970, it was reported (H. H. Brintzinger and J. E. Bercaw, JACS 92:21 pg. 6182–6185) that the titanium metal-organo complex which various investigators had isolated, was not $((C_5H_5)_2Ti)_2$ as had been erroneously reported, but its stable isomer, the hydride $$((C_5H_5)(C_5H_4)TiH)_2.$$

SUMMARY OF THE INVENTION

I have now found that the "zirconocene" prepared by Watt and Drummond's method is actually the hydride dimer $[(C_5H_5)(C_5H_4)ZrH]_2 \cdot xC_{10}H_8$, when all air is carefully excluded; which quickly converts to an oxidized form upon exposure to air, having the Watt and Drummond infrared spectrum.

My preparative method for the true zirconocene structure may briefly be stated as follows:

An alkali metal naphthalene, generally prepared in situ but prior to the addition of the dihalogenide reactant is allowed to react in an ethereal solvent, in an inert atmosphere, and at temperatures below about −35° C. with a dihalogenide of dicyclopentadienyl zirconium. The reaction mixture is allowed to gradually warm to ambient temperatures, the solvent is evaporated, and the naphthalene sublimed, both operations being carried out under reduced pressure, and at temperatures below 40° C. The residue obtained is extracted with an organic solvent or a mixture of solvents, and the product metal-organo complex, complexed with and stabilized by naphthalene, is obtained by removal of the solvent. The highly active product must be protected from oxygen.

DESCRIPTION OF THE PREFERRED EMBODIMENTS

The operations are carried out in a reaction vessel from which all air has been evacuated, or replaced with an inert atmosphere such as argon. An alkali metal, such as potassium, sodium or lithium is stirred with at least the stoichiometric amount of naphthalene in a substantially dry, oxygen-free ethereal solvent such as tetrahydrofuran (THF) or dimethyl ether. Stirring is continued at about ambient temperature until the formation of the metal-naphthalene or "naphthalide" solution is essentially complete, and no appreciable quantity of the elemental alkali metal remains.

The solution is now cooled to a temperature within the range of −200° C. to −35° C., preferably between −200 and −150° C. and approximately the stoichiometric quantity of the dihalogenide such as $(Cp)_2ZrCl_2$ (dicyclopentadienyl zirconium dichloride) is added. Additional ethereal solvent is generally added at this point. Although not essential to the process, it serves to rinse the last of the charge of solid dihalogenide into the reactor.

The temperature is next raised to, and maintained within the range of −100 and −35° C., preferably between −90 and −70° C., for from 30 to 500 hours. Following this the temperature is raised to and maintained between −55 to −25° C. for between 2 to 100 hours, then allowed to warm to ambient temperature. This slow warming period, as well as the low temperatures employed during the reaction are features of the present invention. If prepared at ambient temperatures an inordinate amount of the isomeric hydride would be produced, and if the batch were rapidly warmed to ambient temperatures, the product yield would be adversely affected.

The ethereal solvent and some free naphthalene are next removed by distillation and sublimation in a system from which the gaseous atmosphere has been evacuated, at temperatures below 40° C., preferably between 25 and 35° C. The remaining crude residue is solvent extracted, generally at a temperature between −95° and ambient temperature.

The following example, in which parts are by weight, is descriptive of the novel compound of this invention and sets forth the best mode contemplated by me for its preparation.

EXAMPLE

A reactor was loaded, under an atmosphere of pure argon, with solid potassium droplet sized balls (8.0 gm.), and naphthalene (26.22 gm. + an excess of 19.86 gm.). With the reactor attached to a vacuum line, THF (tetrahydrofuran) solvent (500 ml.) was distilled into the reactor bulb containing the potassium and naphthalene. The mixture was stirred for a period of 24 hours to insure complete dissolution of the metal. This green potassium naphthalene solution was subsequently frozen by cooling with liquid nitrogen. Then $(\pi\text{---}C_5H_5)_2ZrCl_2$ powder (29.90 gm.) was added to the frozen solution together with fresh THF, so as to make a total solution volume of about 1 liter. When addition was complete, the apparatus was allowed to warm to −111° C. where it was kept (with continual and vigorous agitation) for a period of 3 hours. The temperature was then raised to −80° C., where it was kept with continual stirring for 2 weeks. When at −111° C. and in the initial period at −80° C. the solution color was a light heterogeneous brown. After 2 weeks of stirring the color had changed to a brown-green. Subsequent warming, for 2 days at −45° C., ½ day at −35° C., 1 hour at 20° C. produced a deep green homogeneous solution.

The deep green solution mainly contains zirconocene naphthalene, together with some free naphthalene. The following extraction procedure for zirconocene naphthalene was used. All the solvent THF and some of the free $C_{10}H_8$ were removed by vacuum distillation at 20° C. over a period of 8 hours. Fresh THF solvent (700 ml.) was then added to re-form the deep green solution. This was then filtered, as quickly as possible, by applying suction to draw the solution through a glass frit aided by pressure of argon in the reactor. The extraction was repeated with a second 700 ml. of THF. The green zirconocene naphthalene in solution was evaporated to dryness and then washed with 3 × 150 ml. lots of toluene. Zirconocene naphthalene as a black, apparently crystalline, product was left in the recator receiver flask. Yield, 13.8 gm., 40% based on the weight of $(Cp)_2ZrCl_2$ employed.

Characterization of Zirconocene Naphthalene

The product was a coarse black, apparently crystalline, powder. Samples of the material have been kept, under argon, at 20–30° C. without noticeable decomposition. However, the green solutions thereof formed in various solvents, e.g., THF (very soluble), benzene, toluene, mesitylene (slightly soluble) do not keep at 20° C., but rearrange to various blue-colored, relatively inactive zirconocene hydride species.

*Elemental Analyses.*—Found: C, 70.00; H, 4.86; Zr, 24.99. Theory: C, 68.72; H, 5.15; Zr, 26.12 for $C_{10}H_{10}Zr \cdot C_{10}H_8$.

Molecular Weight Measurements

These measurements were attempted for solutions in THF, using the isopiestic method. In this solvent, the substance appears to be polymeric with a molecular weight greater than 2000.

Infrared Spectrum

I.R. spectrum of the material is in excellent agreement with the structure:

$[(\pi-C_5H_5)_2Zr \cdot C_{10}H_8]_n \cdot$ Sharp $(\pi-C_5H_5)$ "metallocene" bands appear at 795 and $1010^{-1}$. On this is superimposed the apparently unperturbed infrared spectrum of naphthalene. Only a very weak absorption at 1300–1400 cm.$^{-1}$, indicative of hydride impurities, is observed.

NMR Spectrum

The spectrum of the zirconocene naphthalene in THF solutions contins a complex set of partially resolved peaks in the region of 4–7 p.p.m. relative to TMS. The fully resolved spectrum of naphthalene moiety, apparently unperturbed by coordination, also appears. The NMR lines in the 4–7 p.p.m. regions are characteristic of the $\pi$-bound $C_5H_5$ species. Though the spectrum cannot be interpreted in terms of a specific molecular configuration, it is consistent with what one would expect from a large polymeric $(C_5H_5)_2Zr$ species, containing loosely coordinated naphthalene.

Reactivity With Dinitrogen

Toluene solutions of zirconocene naphthalene do not react with $N_2$ gas at 1 atm. at 20° to −80° C., as do similar solutions of bi-titanocene.

However zirconocene-dinitrogen complexes are formed upon exposing zirconocene naphthalene solutions to nitrogen gas under pressure of 200 p.s.i. at 20° C.

Zirconocene naphthalene (100 mg.) in toluene (10 gm.) was left over $N_2$ gas at 200 p.s.i. at 20° C. After one day, the green solution color turned distinct brown. This transformation into a brown, toluene soluble, material was complete after 7 days.

Infrared examination of the product showed a familiar "hydride" band, the 800 and 1010 cm.$^{-1}$ (broad) metallocene frequencies, and little or no coordinated naphthalene. To the brown product an excess of potassium naphthalene in THF was first added and then water. Traces of ammonia were detected in this mixture.

I claim:

1. The compound $[(\pi-C_5H_5)_2Zr \cdot C_{10}H_8]_n$ wherein "$n$" designates that said compound is polymeric.

References Cited

Watt et al.: J. of The American Chemical Society, Vol. 88, pp. 5926, 5927 (1966).

HELEN M. S. SNEED, Primary Examiner

U.S. Cl. X.R.

55—387; 260—429 CY

UNITED STATES PATENT OFFICE
CERTIFICATE OF CORRECTION

Patent No. 3,839,381     Dated October 1, 1974

Inventor(s) Guido P. Pez

It is certified that error appears in the above-identified patent and that said Letters Patent are hereby corrected as shown below:

Column 4, line 19: "bi-titanocene" should read -- bis-titanocene --

Column 4, line 35, claim 1: the formula "...$Cr_{10}H_8]_n$" should read -- ...$C_{10}H_8]_n$ --

Signed and sealed this 3rd day of December 1974.

(SEAL)
Attest:

McCOY M. GIBSON JR.
Attesting Officer

C. MARSHALL DANN
Commissioner of Patents